US011379243B2

(12) United States Patent
Gong et al.

(10) Patent No.: US 11,379,243 B2
(45) Date of Patent: Jul. 5, 2022

(54) MICROPROCESSOR WITH MULTISTEP-AHEAD BRANCH PREDICTOR (71) Applicant: Shanghai Zhaoxin Semiconductor Co., Ltd., Shanghai (CN)

(72) Inventors: Fangong Gong, Beijing (CN); Mengchen Yang, Beijing (CN); Guohua Chen, Shanghai (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 17/083,652

(22) Filed: Oct. 29, 2020

(65) Prior Publication Data
US 2021/0311744 A1 Oct. 7, 2021

(30) Foreign Application Priority Data

Apr. 7, 2020 (CN) .......................... 202010263835.1

(51) Int. Cl.
*G06F 9/30* (2018.01)
*G06F 9/38* (2018.01)
*G06F 9/32* (2018.01)

(52) U.S. Cl.
CPC ........ *G06F 9/3844* (2013.01); *G06F 9/30134* (2013.01); *G06F 9/32* (2013.01); *G06F 9/3804* (2013.01)

(58) Field of Classification Search
CPC ...... G06F 9/3844; G06F 9/30134; G06F 9/32; G06F 9/3804; G06F 9/3848; G06F 9/3806; G06F 12/0875
See application file for complete search history.

(56) References Cited

U.S. PATENT DOCUMENTS 5,434,985 A * 7/1995 Emma .................. G06F 9/3806
712/215
7,523,298 B2 4/2009 Gschwind
(Continued)

FOREIGN PATENT DOCUMENTS

CN 101118486 A 2/2008
CN 101427213 A 5/2009
(Continued)

OTHER PUBLICATIONS

Zhang, S.Y., et al.; "The Impact Analysis of Branch Prediction for the Performance of the Superscalar Pipeline;" Microelectronics & Computer; vol. 32; No. 8; Aug. 2015; pp. 167-176.
(Continued)

*Primary Examiner* — Corey S Faherty
(74) *Attorney, Agent, or Firm* — McClure, Qualey & Rodack, LLP (57) ABSTRACT

A microprocessor with a multistep-ahead branch predictor is shown. The branch predictor is coupled to an instruction cache and has an N-stage pipelined architecture, which is configured to perform branch prediction to control the instruction fetching of the instruction cache. The branch predictor performs branch prediction for (N−1) instruction-address blocks in parallel, wherein the (N−1) instruction-address blocks include a starting instruction-address block and (N−2) subsequent instruction-address blocks. The branch predictor is thereby ahead of branch prediction of the starting instruction-address block. The branch predictor stores reference information about branch prediction in at least one memory and performs a parallel search of the memory for the branch prediction of the (N−1) instruction-address blocks.

20 Claims, 6 Drawing Sheets

(56) References Cited

U.S. PATENT DOCUMENTS

| | | | | |
|---|---|---|---|---|
| 8,473,727 | B2 * | 6/2013 | Dunn | G06F 9/3844 |
| | | | | 712/239 |
| 9,146,745 | B2 * | 9/2015 | Jourdan | G06F 9/3804 |
| 10,209,993 | B2 | 2/2019 | Wang et al. | |
| 11,029,959 | B2 * | 6/2021 | Ishii | G06F 9/3806 |
| 2008/0077781 | A1 | 3/2008 | Smith et al. | |
| 2020/0073666 | A1 * | 3/2020 | Ishii | G06F 9/3851 |

FOREIGN PATENT DOCUMENTS

| | | |
|---|---|---|
| CN | 102053818 A | 5/2011 |
| CN | 102306092 A | 1/2012 |
| CN | 105706049 A | 6/2016 |
| CN | 106406823 A | 2/2017 |
| CN | 109308191 A | 2/2019 |

OTHER PUBLICATIONS

English language translation of abstract of "The Impact Analysis of Branch Prediction for the Performance of the Superscalar Pipeline;" p. 1 of publication.

* cited by examiner

|         | T0 | T1 | T2 | T3 | T4 | T5 | T6 | T7 | T8 |
|---------|----|----|----|----|----|----|----|----|----|
| 'C' stage | C  | D  | E  | W  | X  | Y  | Z  |    |    |
|         | B  | C  | D  | V  | W  | X  | Y  | Z  |    |
|         | A  | B  | C  | U  | V  | W  | X  | Y  | Z  |
| 'T' stage |    | C  | D  | E  | W  | X  | Y  | Z  |    |
|         |    | B  | C  | D  | V  | W  | X  | Y  | Z  |
|         |    | A  | B  | C  | U  | V  | W  | X  | Y  |
| 'B' stage |    |    | C  | D  | E  | W  | X  | Y  | Z  |
|         |    |    | B  | C  | D  | D  | W  | X  | Y  |
|         |    |    | A  | B  | C  | U  | V  | W  | X  |
| 'U' stage |    |    |    | C  | D  | E  | W  | X  | Y  |
|         |    |    |    | B  | C  | D  | V  | W  | X  |
|         |    |    |    | A  | B  | C  | U  | V  | W  |
| Flag of valid/invalid branch prediction | | | | | | | | | |

MICROPROCESSOR WITH MULTISTEP-AHEAD BRANCH PREDICTOR

CROSS REFERENCE TO RELATED APPLICATIONS

This Application claims the benefit of China Patent Applications No. 202010263835.1 filed on Apr. 7, 2020, the entirety of which are incorporated by reference herein.

BACKGROUND OF THE INVENTION

Field of the Invention

The present invention relates to a branch predictor of a microprocessor.

Description of the Related Art

In a pipelined microprocessor architecture, a branch predictor is generally a digital circuit that predicts how a branch instruction (e.g., a conditional branch instruction 'if-then-else', a call instruction 'call', a return instruction 'return', or an unconditional branch instruction 'jump') is performed. The branch predictor effectively accelerates the instruction fetching of the microprocessor, and significantly improves the performance of a pipelined microprocessor.

However, the branch predictor needs several timing cycles to generate a branch prediction result (i.e., a branch is taken or not-taken and the jumping target address) due to the multiple stages of calculations in the pipeline architecture. During these timing cycles, the subsequent instruction addresses which should be skipped by a taken branch may be still input into the branch predictor successively. The meaningless branch prediction for those instruction addresses which will not be executed may cause delays.

BRIEF SUMMARY OF THE INVENTION

A multistep-ahead branch prediction technology is proposed in the present invention. Branch prediction is performed on consecutive instruction-address blocks in parallel. Because of the multistep-ahead branch prediction, meaningless branch predictions are skipped, and the delay problem is solved.

A microprocessor in accordance with an exemplary embodiment of the present invention includes an instruction cache and a branch predictor. The branch predictor is coupled to the instruction cache and has an N-stage pipelined architecture, which is configured to perform branch prediction to control the instruction fetching of the instruction cache. N is a natural number. The branch predictor performs branch prediction for (N−1) instruction-address blocks in parallel, wherein the (N−1) instruction-address blocks include a starting instruction-address block and (N−2) subsequent instruction-address blocks. The branch predictor stores reference information about branch prediction in at least one memory and performs a parallel search of the memory for the branch prediction of the (N−1) instruction-address blocks.

In an exemplary embodiment, the branch predictor includes a first memory, (N−1) sets of branch logic circuits, and a first multiplexer. The first memory is configured as a branch target address cache that outputs (N−1) pieces of branch destination information in parallel corresponding to the starting instruction-address block and the (N−2) subsequent instruction-address blocks. The (N−1) pieces of branch destination information are processed by the (N−1) sets of branch logic circuits and then sent to the first multiplexer, and a branch destination block is indicated by an output of the first multiplexer.

In an exemplary embodiment, the first memory includes at least (N−1) memory banks, and the different memory banks correspond to different instruction-address blocks identified by lower bits of instruction-address block address. The (N−1) pieces of branch destination information are stored in the different memory banks to be accessed in parallel.

In an exemplary embodiment, the first memory includes (N−1) input ports to receive the starting instruction-address block and the (N−2) subsequent instruction-address blocks in parallel and thereby the (N−1) pieces of branch destination information are accessed in parallel.

In an exemplary embodiment, the branch predictor includes a second memory, storing a branch history table. The branch history table is searched according to a plurality of calculated results, wherein calculations are performed on the starting instruction-address block and the (N−2) subsequent instruction-address blocks respectively with a corresponding history pattern to generate the calculated results. By searching the branch history table, branch directions corresponding to the starting instruction-address block and the (N−2) subsequent instruction-address blocks are provided to control the (N−1) sets of branch logic circuits.

In an exemplary embodiment, when the starting instruction-address block and the (N−2) subsequent instruction-address blocks overlap (N−1) instruction-address blocks processed in a previous round of branch prediction, overlapped instruction-address blocks are omitted from processing by the branch predictor again, and each non-overlapped instruction-address block is processed by the branch predictor for parallel branch prediction based on the plurality of history pattern assumptions. A matched branch prediction is selected after the incomplete history pattern is made up. The history pattern assumptions may be made to consider a case wherein an earlier instruction-address block whose branch prediction is unfinished involves no branch and a case wherein the earlier instruction-address block involves a branch not to be taken.

It is not necessary to tie the starting instruction-address block that entered the branch prediction to an instruction-fetching block of the instruction cache. In an exemplary embodiment, the starting instruction-address block is synchronized to the instruction-fetching block of the instruction cache. In another exemplary embodiment, the starting instruction-address block leads the instruction-fetching block of the instruction cache.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

Figure 1:
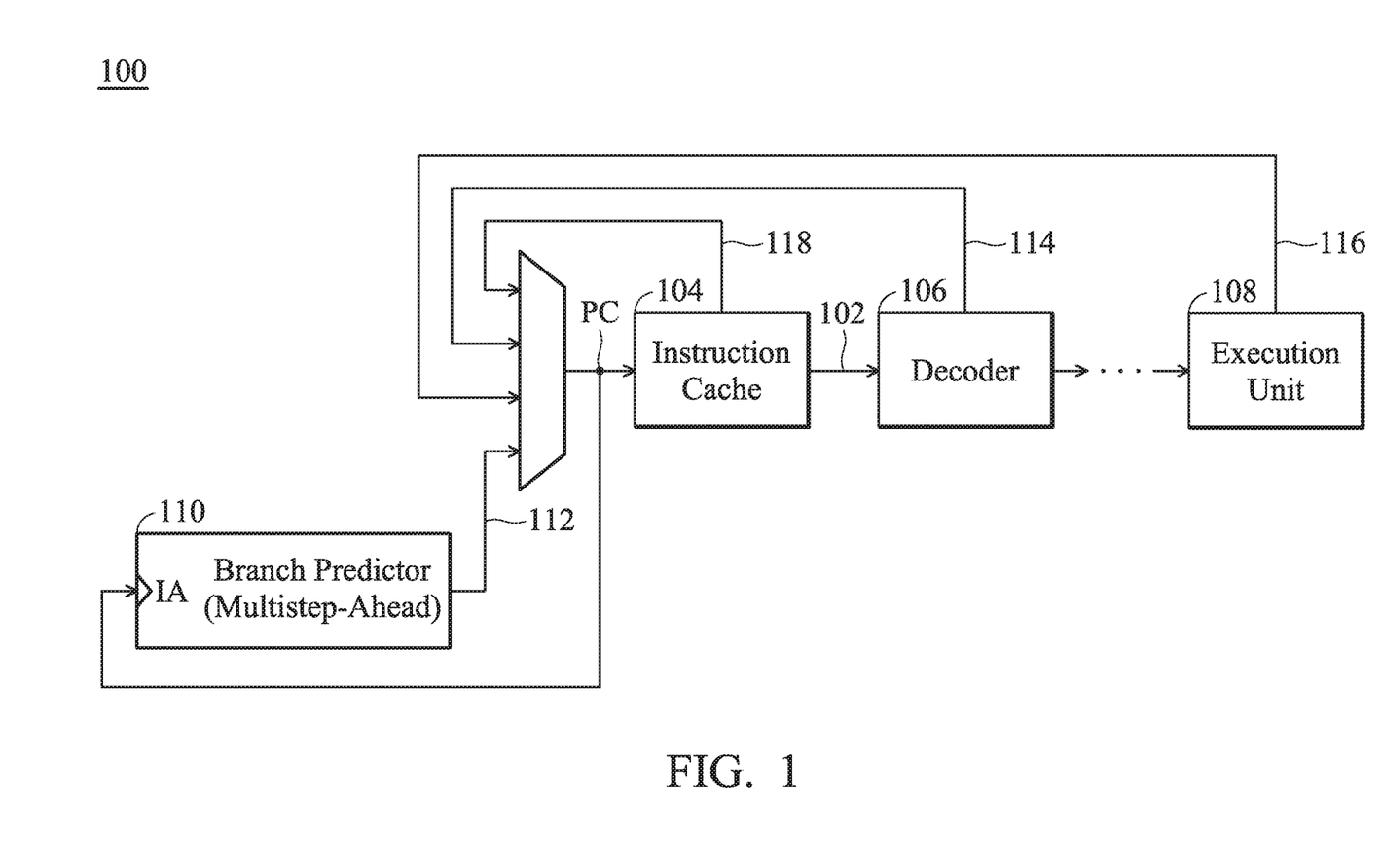
FIG. 1 depicts a microprocessor 100 in accordance with an exemplary embodiment of the present invention.

FIG. 1 depicts a microprocessor 100 in accordance with an exemplary embodiment of the present invention.

According to an instruction-fetching address PC (i.e., a program counter), an instruction 102 is fetched from an instruction cache (e.g., L1i) 104, decoded by a decoder 106, and finally executed by an execution unit 108. The instruction-fetching address PC is further sent to a branch predictor 110 as an input (which is an instruction address IA) and, accordingly, the branch predictor 110 generates a branch prediction result 112 to update the instruction-fetching address PC. When the decoder 106 or the execution unit 108 detects a prediction error, a flushing procedure is performed to update the instruction-fetching address PC with the correct instruction-fetching address 114 and 116. In some situations, the requested instructions may not exist in the instruction cache 104 (cache missing). In response to the cache missing, the missed instructions are first loaded to the instruction cache 104, then the instruction-fetching address PC is updated by the backup of the missed instruction addresses 118, and then the instruction cache 104 is accessed again to complete the requested instruction fetching.

A multistep-ahead branch prediction technology is proposed in the present invention.

In FIG. 1, the instruction-fetching address PC is also input the branch predictor 110. That is, in the exemplary embodiment of FIG. 1, the instruction address IA entered to the branch predictor 110 is synchronized with the instruction-fetching address PC entered to the instruction cache 104. It should be noted that the branch prediction of the branch predictor 110 and the instruction fetching of the instruction cache 104 of this exemplary embodiment are performed in units of blocks. Each block includes 16 bytes of instructions. Each instruction-address block to be processed by the branch predictor 110 involves 16 instruction addresses IAs. Each instruction address IA relates to the branch prediction operation of 1 byte of instructions. Each block of instruction fetching on the instruction cache 104 involves 16 instruction-fetching addresses PCs. Each instruction-fetching address PC relates to the instruction fetching operation of 1 byte of instructions. It is not intended to limit the block size. In addition to performing branch prediction on "the instruction-address block" (16 bytes of instructions) starting from an instruction-fetching address PC, the branch predictor 110 may further perform branch prediction on at least one subsequent instruction-address block (with a starting instruction address such as PC+16, PC+32, and so on) at the same time. In the following discussion, each block (for branch prediction or instruction-fetching) involves 16 consecutive addresses, and relates to 16 bytes of instructions. The instruction-address block size may be set to the other values. For the sake of simplicity, in the following description, "instruction-address block PC" represents 16 bytes of consecutive instructions starting from the instruction address PC, "subsequent instruction-address block PC+16" represents 16 bytes of consecutive instructions starting from the instruction address PC+16, and so on. In this way, during the instruction fetching of instruction-address block PC (performed on the instruction cache 104), the branch predictor 110 does not only perform branch prediction on instruction-address block PC, but also performs branch prediction on instruction-address blocks PC+16 and PC+32. The multistep-ahead branch prediction is performed. A taken branch in instruction-address block PC+16 or instruction-address block PC+32 can be detected and dealt early.

In the example of FIG. 1, the instruction-address block PC sent to the branch predictor 110 for branch prediction is also sent to the instruction cache 104 for instruction fetching, and the branch predictor 110 and the instruction cache 104 are synchronized. In the other exemplary embodiments, the branch predictor 110 may be significantly ahead of the instruction cache 104. All instruction-address blocks sent to the branch predictor 110 for branch prediction in parallel are ahead of the instruction-fetching block sent to the instruction cache 104 for instruction fetching.

For the sake of brevity, the following discussion ties the starting instruction-address block for branch prediction with the instruction-fetching block PC, but it is not intended to limit it. Any microprocessor capable of performing branch prediction on a plurality of consecutive instruction-address blocks in parallel (no matter the starting instruction-address block is synchronized to the instruction-fetching block PC or not) is within the scope of the present invention.

Figure 2:
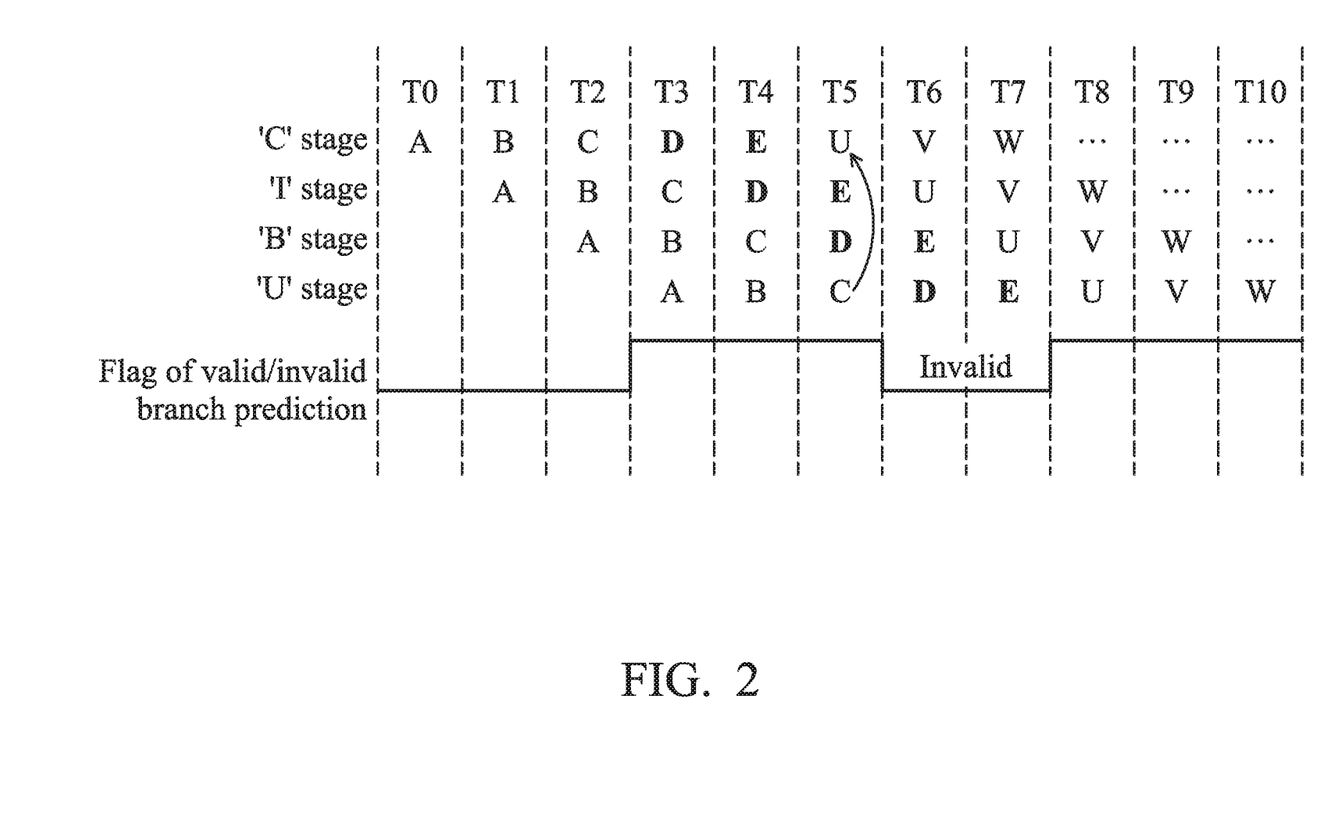
FIG. 2 depicts the pipelined calculations of a traditional branch predictor.

FIG. 2 depicts the pipelined calculations of a traditional branch predictor. The branch predictor is in a 4-stage pipelined architecture, including four stages: 'C', 'I', 'B' and 'U'. In timing cycle T5, the U-stage calculations of the branch predictor 110 predict that a branch in instruction-address block C will be taken and the branch destination is instruction-address block U. The predicted branch destination U is not only applied to the instruction fetching (e.g. to update the instruction-fetching address PC), but is also sent to the branch predictor for the C-stage calculations (for the branch prediction in the direction of the taken branch). However, prior to the timing cycle T5, instruction-address blocks D and E which should be ignored by the taken branch in instruction-address block C have been sent to the branch predictor 110 for the C-stage calculations in timing cycles T3 and T4. Thus, meaningless branch prediction results are generated in the U-stage calculations in timing cycles T6 and T7. The wasted timing cycles T6 and T7 are called bubbles. The branch prediction is not efficient.

Figure 3:
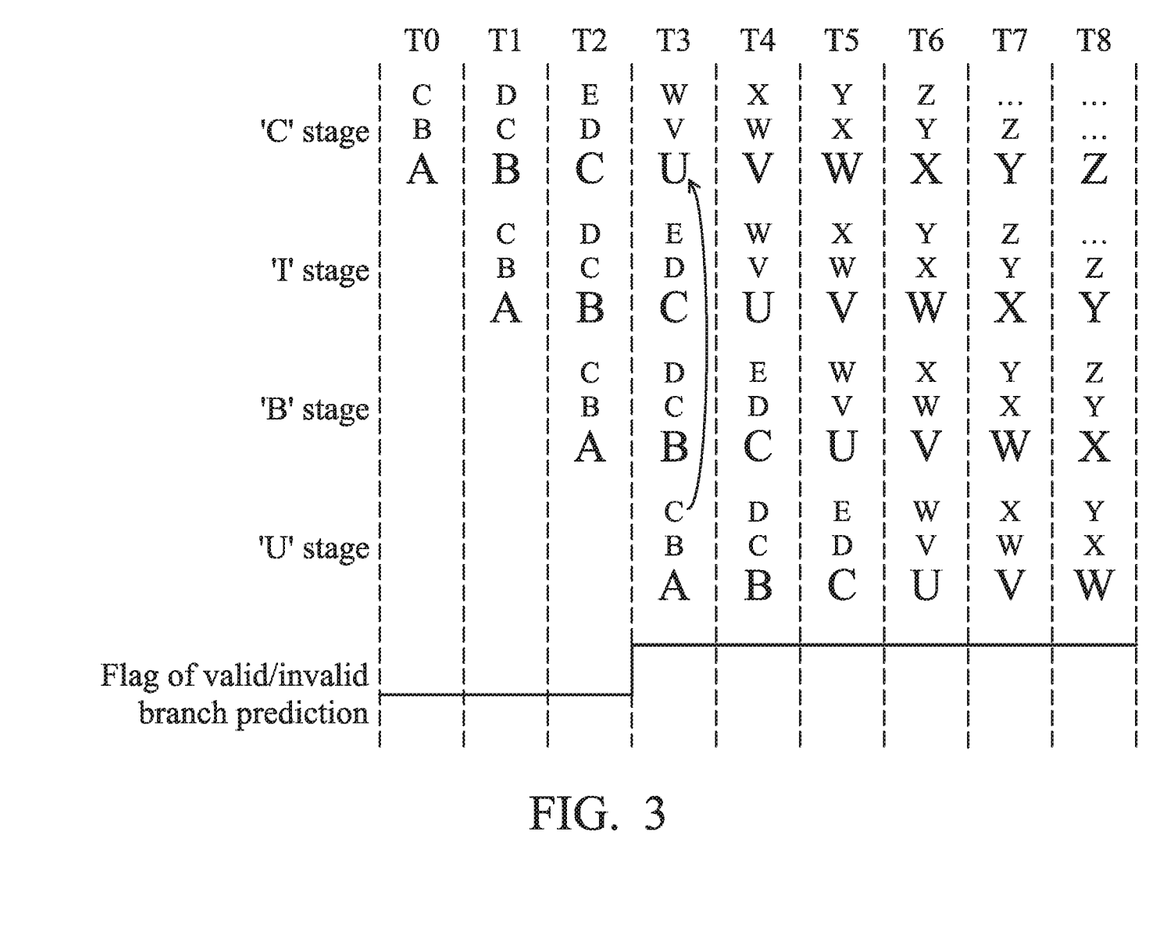
FIG. 3 depicts the pipelined calculations of the multistep-ahead branch predictor 110 in accordance with an exemplary embodiment of the present invention.

FIG. 3 depicts the pipelined calculations of the multistep-ahead branch predictor 110 in accordance with an exemplary embodiment of the present invention. The branch predictor 110 also has a four-stage pipelined architecture, including four stages: 'C', 'I', 'B' and 'U'. The branch predictor 110 performs branch prediction on a plurality of instruction-address blocks in parallel. As shown, branch prediction is performed on three instruction-address blocks in parallel. In timing cycle T0, not only the starting instruction-address block A, two subsequent instruction-address blocks B and C are also sent to the branch predictor 110. In timing cycle T3, the branch prediction of the instruction-address blocks A, B and C proceeds to the U-stage calculations. The branch prediction results of the three instruction-address blocks are evaluated at the same time. The prediction shows that a branch in instruction-address block C will be taken and the branch destination is instruction-address block U. The branch predictor 110 could perform C-stage calculations on the branch destination, instruction-address block U, in timing cycle T3, earlier than the conventional example depicted in FIG. 2 which predicts the taken branch in timing cycle T5. In FIG. 3, each timing cycle could outputs a meaningful branch prediction result since the timing cycle T3. The two bubbles of FIG. 2 are successfully eliminated.

Figure 4:
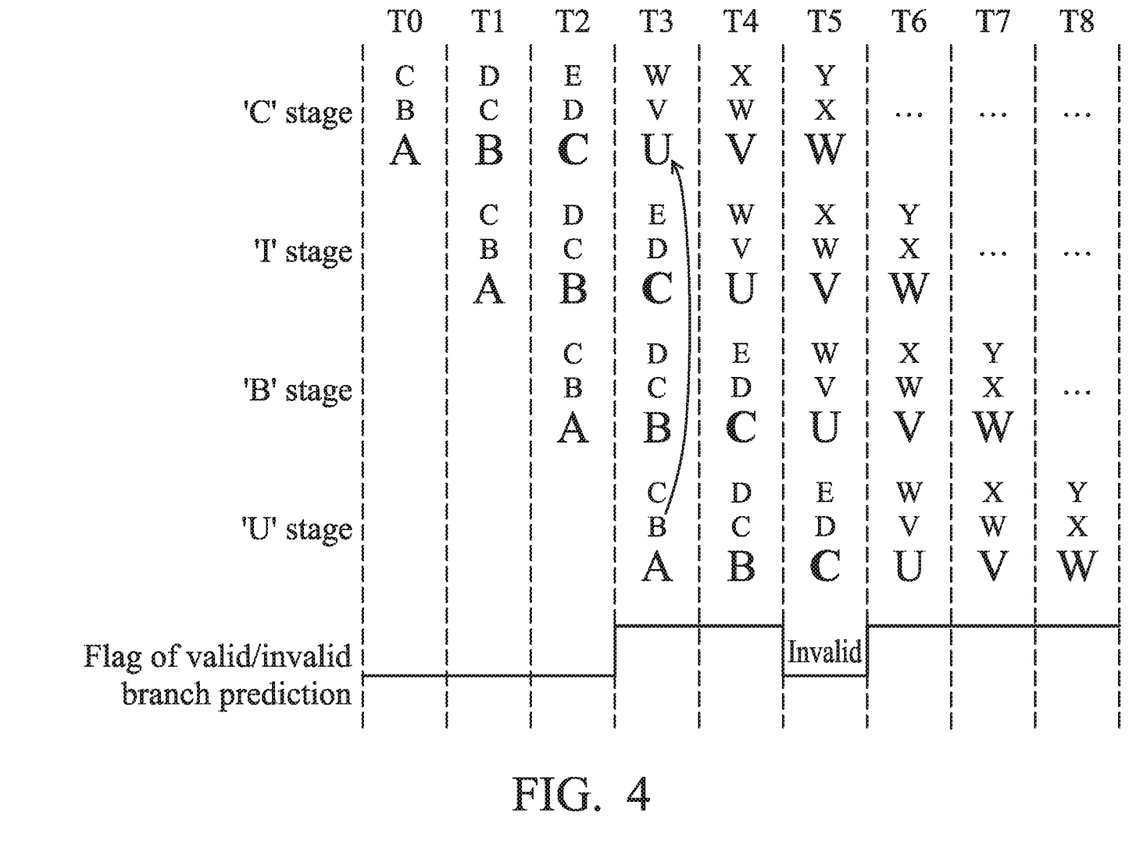
FIG. 4 depicts the pipelined calculations of the multistep-ahead branch predictor 110 in accordance with another exemplary embodiment of the present invention.

FIG. 4 depicts the pipelined calculations of the multistep-ahead branch predictor 110 in accordance with another exemplary embodiment of the present invention. Different from FIG. 3 in which a taken branch from instruction-address block C to instruction-address block U is predicted in timing cycle T3, FIG. 4 shows that in timing cycle T3 the predicted taken branch is from instruction-address block B to instruction-address block U. In this situation, the meaningless instruction-address blocks C, D, and E which should be skipped are sent to the branch predictor 110 for C-stage calculations in timing cycle T2. Along the 4-stage pipelined architecture, the branch prediction results of the three meaningless instruction-address blocks C, D, and E are obtained by the U-stage calculations of the branch predictor 110 in timing cycle T5. One bubble (a delay of one timing cycle) is presented. However, it is still an improvement compared to the two bubbles in FIG. 2.

Figure 5:
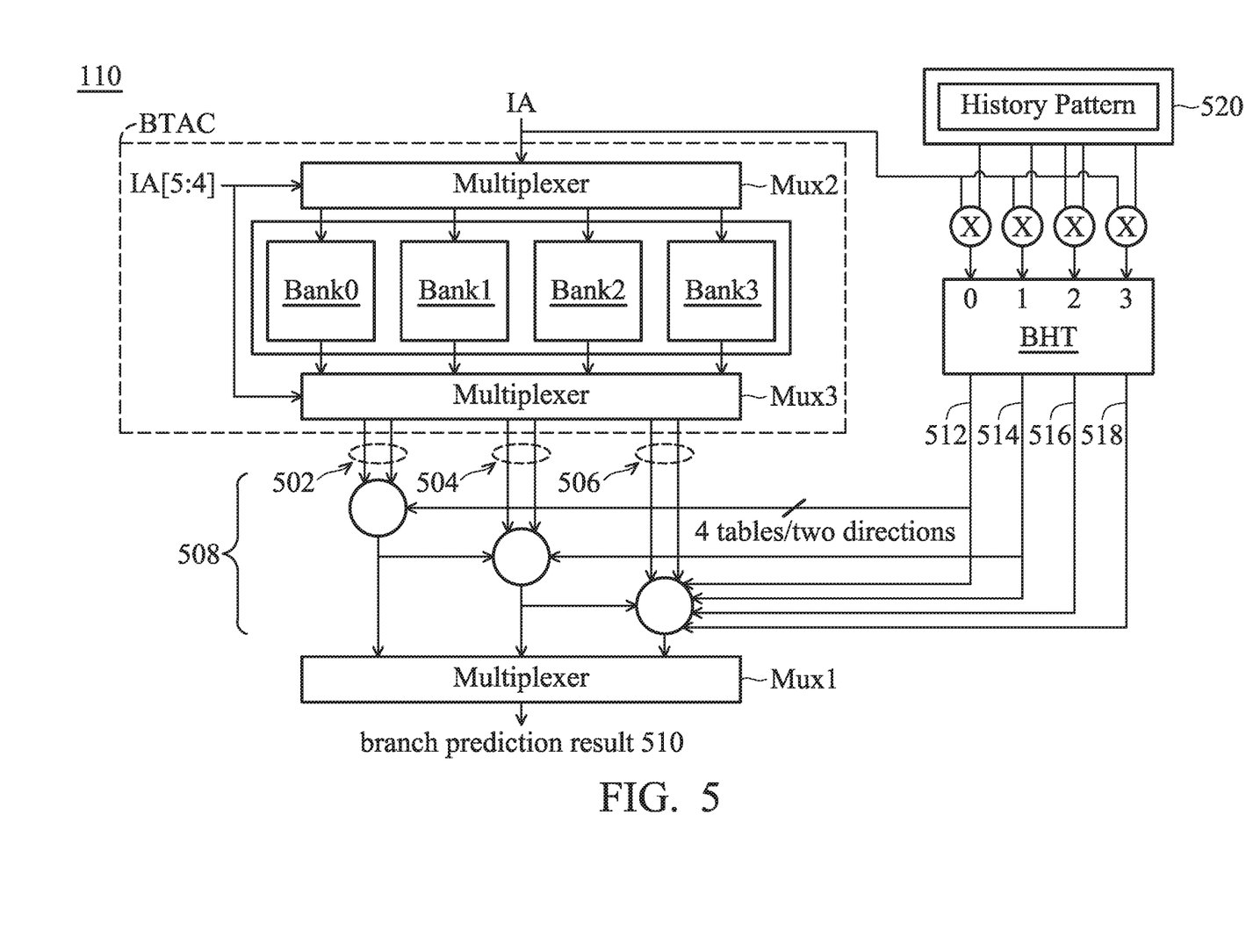
FIG. 5 illustrates detailed hardware design of the branch predictor 110 in accordance with an exemplary embodiment of the present invention.

FIG. 5 illustrates detailed hardware design of the branch predictor 110 in accordance with an exemplary embodiment of the present invention.

The branch predictor 110 includes two memories, which can be implemented by static random access memories (SRAMs). One is configured as a branch target address cache BTAC. Another is configured to store a branch history table BHT.

The branch target address cache BTAC stores branch destination information for each instruction-address block, which includes but is not limited to: a branch type, a target address, an address offset of a branch instruction in the corresponding instruction-address block (16 bytes), and so on.

There are many types of branch instructions, including: conditional branch instructions such as 'if-then-else'; a 'call' instruction; a 'return' instruction; unconditional branch instructions such as 'jump'; and so on. In particular, there are multiple choices for the target address of a conditional branch instruction, whose branch direction needs to be predicted to be taken or not taken. The branch history table BHT is established for branch direction prediction, to predict whether a branch is taken or not taken.

Taking the 4-stage pipelined architecture as an example, the branch predictor 110 may perform branch prediction on a starting instruction-address block IA and its subsequent instruction-address blocks IA+16 and IA+32 in parallel (a total of three, different from the traditional technology that performs branch prediction on only one instruction-address block at the same time). Corresponding to the instruction-address blocks IA, IA+16 and IA+32, three pieces of branch destination information 502, 504, and 506 are provided by the branch target address cache BTAC in parallel to be processed by the three sets of branch logic circuits (referring to 508) and then sent to the multiplexer Mux1. A parallel search is performed on the branch history table BHT to obtain four possible branch directions 512, 514, 516, 518 to control the three sets of branch logic circuits (508). The multiplexer Mux1 outputs a branch prediction result 510. When it is predicted that a branch will be taken, the branch prediction result 510 indicates a branch destination block. When it is predicted that a branch will not be taken, the branch prediction result 510 indicates a subsequent instruction-address block. The branch prediction result 510 may be applied to the branch predictor 110 as the input of a new round of branch prediction, and may be also applied to the instruction cache 104 as an input.

In an exemplary embodiment wherein the input (indicating the instruction instruction-address block IA) of the branch predictor 110 is synchronized to the input (indicating the instruction-fetching block PC) of the instruction cache 104, the branch prediction result 510 is applied to update the instruction-fetching block PC, and the updated instruction-fetching block PC is applied to the branch predictor 110 as the instruction instruction-address block IA of a new round. Referring to FIG. 3 and FIG. 4, because the input of the branch predictor 110 needs to be synchronized with the input of the instruction cache 104 but every timing cycle just one instruction-address block is allowed to be fetched from the instruction cache 104, the three instruction-address blocks entered to the branch predictor 110 in the current timing cycle need overlapping two of the three instruction-address blocks entered to the branch predictor 110 in the previous timing cycle. For example, referring to timing cycle T0, the input entered to the branch predictor 110 indicates instruction-address blocks A, B and C. Referring to timing cycle T1, the input entered to the branch predictor 110 indicates instruction-address blocks B, C and D. The input entered to the branch predictor 110 in the following timing cycles follow the similar rule.

In another exemplary embodiment wherein the input (indicating the instruction instruction-address block IA) of the branch predictor 110 is allowed to be ahead of the input (indicating the instruction-fetching block PC) of the instruction cache 104, the branch prediction result 510 is applied to the branch predictor 110 to set the input IA of a new round without being applied to update the instruction-fetching block PC. The multiple instruction-address blocks entered to the branch predictor 110 in the current timing cycle may not overlap the multiple instruction-address blocks entered to the branch predictor 110 in the previous timing cycle. The branch prediction is further accelerated.

The multistep-ahead branch prediction may be achieved by a parallel search of the branch target address cache BTAC, and a parallel search of the branch history table BHT.

In an exemplary embodiment, the starting instruction-address block IA and its subsequent instruction-address blocks IA+16 and IA+32 each involve 16 instruction addresses, and each instruction address relates to 1 byte of instructions. That is, each instruction-address block relates to 16 bytes of instructions. As shown, the branch target address cache BTAC has four memory banks Bank0, Bank1, Bank2 and Bank3, which are identified by the lower bits of instruction-address block address, e.g., bits [5:4] of instruction address. For example, the four banks Bank0, Bank1, Bank2 and Bank3 may be identified by four binary values 00, 01, 10 and 11. Three pieces of branch destination information corresponding to the three instruction-address blocks IA, IA+16 and IA+32 are stored separately in three memory banks. According to the lower bits of the instruction-address block address (e.g., IA[5:4]), three memory banks are read to output the requested three pieces of branch destination information. As shown, the branch target address cache BTAC includes two multiplexers Mux2 and Mux3, which are operated according to IA[5:4] to access three memory banks corresponding to the instruction-address blocks IA, IA+16, and IA+32 among the four memory banks Bank0, Bank1, Bank2 and Bank3 in parallel. With this memory bank design, the parallel search of the branch target address cache BTAC can be achieved via a single input port IA.

Alternatively, the branch target address cache BTAC may not rely on the memory bank technology, but is fabricated to provide at least three input ports to achieve the parallel search.

In an exemplary embodiment, each memory bank (or each input port) of the branch target address cache BTAC is responsible to the branch prediction of at most two branch instructions in the 16 bytes instructions corresponding to the same instruction-address block (but not limited thereto). In the same instruction-address block, when the first branch is predicted to be taken, the second branch instruction will be ignored; only the branch prediction of the first branch instruction is meaningful. When the first branch is predicted not to be taken, branch prediction should be performed on the second branch instruction. For each instruction-address block, the corresponding piece of branch destination information is about the branch prediction of two branch instructions in its 16 bytes instructions. The piece of branch destination information corresponding to the starting instruction-address block IA is labeled 502. The piece of branch destination information corresponding to the subsequent instruction-address block IA+16 is labeled 504. The piece of branch destination information corresponding to the subsequent instruction-address block IA+32 is labeled 506. The three pieces of branch destination information 502, 504 and 506 involve three pairs of branch prediction (corresponding to 6 branch instructions). Based on the possible branch directions 512, 514, 516, 518 obtained from the branch history table BHT, the branch prediction result 510 is obtained from the three pairs of branch prediction. In particular, the multiplexer Mux1 outputs the branch prediction of the most former branch instruction (i.e., the branch instruction closest to the starting instruction-address block IA) as the branch prediction result 510. It should be noted that the present invention is not limited to this. In order to adapt to the situation that the number of branch instructions in each 16B instructions corresponding to one instruction-address block may usually be greater than two, the branch target address cache BTAC can be adapted to output branch destination information for 3 or more branch instructions of each instruction-address block.

The branch history table BHT is searched as follows.

As the microprocessor 100 runs, the shift register 520 records a history pattern for conditional branch instructions. In another exemplary embodiment, the history pattern may be stored in another kind of memory. When a branch is taken, '1' is recorded in the history pattern. When a branch is not taken, '0' is recorded in the history pattern. Calculations are performed on the starting instruction-address block IA and the subsequent instruction-address blocks IA+16 and IA+32 respectively with their corresponding history pattern to generate corresponding calculated results. The branch history table BHT is indexed and searched according to the calculated results and, accordingly, possible branch directions 512, 514, 516, 518 are read from branch history table BHT. In an exemplary embodiment, a hash operation or a bitwise exclusive- or operation may be applied to implement the calculations. In an exemplary embodiment, the possible branch directions 512~518 may be further sent to a 2-bit saturation counter, which uses one bit to show the branch direction and uses the other bit to show the branch strength. The 2-bit saturation counter may suggest: strongly to take a branch, weakly to take a branch, weakly not to take a branch, and strongly not to take a branch. The 2-bit saturation counter may be dynamically changed between the four states according to the prediction reliability. For example, when suggesting strongly to take (or not to take) a branch, the 2-bit saturation counter will not be changed to modify the branch direction until two consecutive prediction errors are accumulated.

Compared with accessing the branch target address cache BTAC according to the sequential instruction-address blocks (IA, IA+16, IA+32), the branch history table BHT is randomly searched due to the bitwise exclusive-or operation. In an exemplary embodiment, the memory storing the branch history table BHT needs four input ports (numbered 0~3) for entering four indexes in parallel to search the branch history table BHT, more complex than the branch target address cache BTAC that includes four memory banks Bank0~Bank3 and only requires one index port.

Figure 6:
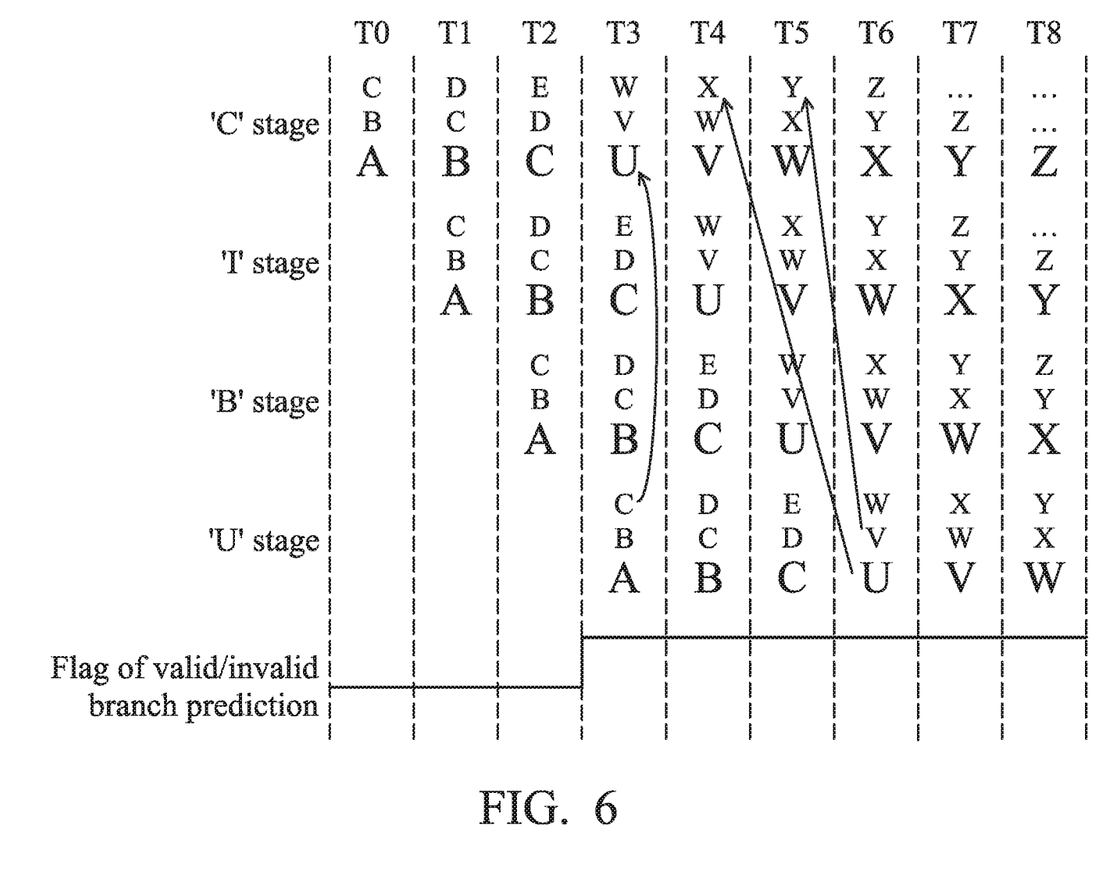
FIG. 6 adds annotations on the example in FIG. 3.

However, the multistep-ahead branch predictor 110 may not update the history pattern in the shift register 520 in time. FIG. 6 adds annotations on the example in FIG. 3.

As shown, in timing cycle T3, a branch obtained from instruction-address block C is predicted to be taken and the branch destination block is instruction-address block U. In the instruction-address blocks V, W and X following the instruction-address block U, no branch is predicted to be taken. The input instruction-address block (or starting instruction-address block) in timing cycles T0 to T8 are A, B, C, U, V, W, X, Y, and Z respectively.

The branch predictor 110 is in a four-stage pipelined architecture. For an instruction-address block proceeds to the first pipeline stage ("C" stage), the latest record of the history pattern it could refer to is collected from the fourth pipeline stage ("U" stage). For each input instruction-address block, the latest record of the history pattern the input instruction-address block could refer to is a history pattern that is three timing cycles older than the input instruction-address block itself.

In timing cycle T3, the history pattern for the branch direction prediction of instruction-address block U needs to include the prediction result of instruction-address block A (that leads the instruction-address block U three timing cycles), the history pattern for the branch direction prediction of instruction-address block V needs to include the prediction result of instruction-address block B (that leads the instruction-address block V three timing cycles), and the history pattern for the branch direction prediction of instruction-address block W needs to include the prediction result of instruction-address block C (that leads the instruction-address block W three timing cycles). As shown, the three instruction-address blocks A, B, and C indeed have been sent to the "U" stage in timing cycle T3, and their prediction results have been applied to update the history pattern in the shift register 520. The history pattern for the branch prediction of instruction-address blocks U, V and W is complete.

In timing cycle T4, instruction-address block X proceeds to the C-stage calculations for the multistep-ahead branch prediction. The history pattern for the branch direction prediction of instruction-address block X needs to include the prediction result of instruction-address block U (that leads the instruction-address block X three timing cycles). However, FIG. 6 shows that instruction-address block U has not been sent to the "U" stage in timing cycle T4, and its prediction result has not been applied to update the history pattern in the shift register 520.

It is the same problem in timing cycle T5. Instruction-address block Y proceeds to the C-stage calculations for the multistep-ahead branch prediction in timing cycle T5. The history pattern for the branch direction prediction of instruction-address block Y needs to include the prediction result of instruction-address block V (that leads the instruction-address block Y three timing cycles). However, FIG. 6 shows that instruction-address block V has not been sent to the "U" stage in timing cycle T5, and its prediction result has not been applied to update the history pattern in the shift register 520.

The following explains how to deal with the incomplete history pattern in timing cycles T4 and T5.

Table 1 shows a solution to the incomplete history pattern in timing cycle T4.

TABLE 1

| Port | Prediction Target | History pattern needs to further include prediction result of: |
|---|---|---|
| 0 | V (entered as IA) | B |
| 1 | W (i.e., IA + 16) | C |
| 2 | X (i.e., IA + 32) | U (no branch) |
| 3 | X (i.e., IA + 32) | U (not-taken branch) |

In timing cycle T4, the prediction input instruction-address block IA is instruction-address block V, and the subsequent instruction-address blocks IA+16 and IA+32 which are also predicted in the timing cycle T4 are instruction-address blocks W and X. The history pattern for the branch direction prediction of instruction-address block V needs to include the prediction result of instruction-address block B, the history pattern for the branch direction prediction of instruction-address block W needs to include the prediction result of instruction-address block C, and the history pattern for the branch direction prediction of instruction-address block X needs to include the prediction result of instruction-address block U. However, the prediction result of instruction-address block U is unavailable in timing cycle T4. As listed in Table 1, memory input ports 0 and 1 for looking up the branch history table BHT can normally receive the look-up indexes IA and IA+16. As for the branch direction prediction of instruction-address block X, the history pattern is still not complete due to the lack of the prediction result of instruction-address block U. It is necessary to simulate all possible branch directions (i.e., making history pattern assumptions) as detailed below. Memory input ports 2 and 3 for looking up the branch history table BHT are designed to correspond to the various history pattern assumptions. For instruction-address block U whose branch prediction has not be completed yet, simulation for "no branch" case and simulation for "not-taken branch" case both are required, Thus, history pattern assumptions are made. Through memory input ports 2 and 3, the branch history table BHT is searched and thereby two possible branch directions for instruction-address block X are evaluated. The matched branch direction is selected later when the branch prediction of instruction-address block U is completed. It should be noted that the simulation for a "taken branch" case is not required. When a branch is predicted to be taken in instruction-address block U, the branch prediction of instruction-address block X is meaningless. The incorrect branch prediction of instruction-address block X is removed in timing cycle T6, based on the branch prediction of instruction-address block U completed by the U-stage calculations in timing cycle T6.

In another exemplary, the repeated branch direction prediction of the overlapped instruction-address blocks V and W (also predicted in the previous round) can be omitted. In timing cycle T4, only the branch prediction for instruction-address block X is required. Table 2 shows how to access the branch history table BHT.

TABLE 2

| Port | Prediction Target | History pattern needs to further include prediction result of: |
|---|---|---|
| 0 | X (i.e., IA + 32) | U (no branch) |
| 1 | X (i.e., IA + 32) | U (not-taken branch) |

Through memory input ports 0 and 1, two possible branch directions of instruction-address block X are evaluated in parallel based on the "no branch" assumption and the "not-taken branch" assumption of instruction-address block U. When there are two repeated instruction-address blocks between the three instruction-address blocks predicted in the previous round and the three instruction-address blocks to be predicted in the current round, the repeated prediction can be eliminated from the current round without being processed by the branch predictor 110. Only the non-repeated instruction-address block is processed by the branch predictor 110 in the current round, for the parallel branch prediction based on the various history pattern assumptions.

Table 3 shows a solution to the incomplete history pattern in timing cycle T5.

TABLE 3

| Prediction Target | History pattern needs to further include prediction result of: |
|---|---|
| W (entered as IA) | C |
| X (i.e., IA + 16) | U (no branch) |
| X (i.e., IA + 16) | U (not-taken branch) |
| Y (i.e., IA + 32) | U (no branch) & V (no branch) |
| Y (i.e., IA + 32) | U (no branch) & V (not-taken branch) |
| Y (i.e., IA + 32) | U (not-taken branch) & V (no branch) |
| Y (i.e., IA + 32) | U (not-taken branch) & V (not-taken branch) |

In timing cycle T5, the input instruction-address block IA is instruction-address block W, and the subsequent instruction-address blocks IA+16 and IA+32 which are also predicted in the timing cycle T5 are instruction-address blocks X and Y. The history pattern for the branch direction prediction of instruction-address block W needs to include the prediction result of instruction-address block C, the history pattern for the branch direction prediction of instruction-address block X needs to include the prediction result of instruction-address block U, and the history pattern for the branch direction prediction of instruction-address block Y needs to include the prediction result of instruction-address block V. However, the prediction results of instruction-address blocks U and V are unavailable in timing cycle T5. The branch direction prediction of instruction-address blocks X and Y should be performed based on all possible branch directions of the instruction-address blocks U and V. As listed in Table 3, timing cycle T5 involve 7 kinds of branch direction prediction. Because the 3 kinds of branch direction prediction related to instruction-address blocks W and X are also performed in the previous round as shown in Table 1, only the 4 kinds of branch direction prediction related to instruction-address block Y are necessary. Table 4 shows another way instead of Table 3 to deal with the incomplete history pattern in timing cycle T5.

TABLE 4

| Port | Prediction Target | History pattern needs to further include prediction result of: |
|---|---|---|
| 0 | Y (i.e., IA + 32) | U (no branch) & V (no branch) |
| 1 | Y (i.e., IA + 32) | U (no branch) & V (not-taken branch) |
| 2 | Y (i.e., IA + 32) | U (not-taken branch) & V (no branch) |
| 3 | Y (i.e., IA + 32) | U (not-taken branch) & V (not-taken branch) |

Through memory input ports 0 to 3, the branch history table BHT is searched for branch direction prediction of the instruction-address block Y based on all possible history pattern assumptions. Through memory input port 0, the branch history table BHT is searched for branch direction prediction of instruction-address block Y based an assumption that there is no branch in both of instruction-address blocks U and V. Through memory input port 1, the branch history table BHT is searched for branch direction prediction of instruction-address block Y based an assumption that there is no branch in instruction-address block U and there is a not-taken branch in instruction-address block V. Through memory input port 2, the branch history table BHT is searched for branch direction prediction of instruction-address block Y based an assumption that there is a not-taken branch in instruction-address block U and there is no branch in instruction-address block V. Through memory input port 3, the branch history table BHT is searched for branch direction prediction of instruction-address block Y based an assumption that there are not-taken branches in both instruction-address blocks U and V. The real branch prediction of instruction-address blocks U and V is completed in timing cycle T6 and T7 respectively. The matched branch direction among all the possible branch directions of instruction-address block Y is determined in timing cycle T7 based on the real branch prediction of instruction-address blocks U and V.

Referring to tables 2 and 4 which omit the repeated branch prediction (which is also performed in the previous round), the number of memory input ports for looking up the branch history table BHT is limited within a reasonable number. In an exemplary embodiment, the number of memory input ports for looking up the branch history table BHT is $2^{(N-2)}$, which are designed to receive instruction addresses of $2^{(N-2)}$ instruction-address blocks in parallel. For example, referring to the examples discussed in tables 2 and 4, it's enough to design four memory input ports ($2^2$) for looking the branch history table BHT. N is the number of the pipelined stages of the branch predictor 110.

In the foregoing examples, the branch predictor 110 is in a 4-stage pipelined architecture (not limited thereto).

In an exemplary embodiment of the present invention, a branch predictor is in an N-stage pipelined architecture, and N is a natural number. Instead of performing branch prediction for just one instruction-address block each round, the branch predictor can perform branch prediction of (N−1) consecutive instruction-address blocks in parallel, which is significantly ahead of the conventional branch prediction scheme. Specifically, the branch predictor of the present invention stores the reference information about branch prediction in at least one memory (such as the memory work as BTAC and/or the memory storing BHT) that is accessed in a parallel way.

The branch target address cache BTAC may include at least (N−1) memory banks. The number of memory input ports for accessing the memory storing the branch history table BHT may be $2^{(N-2)}$.

In an exemplary embodiment, the instruction address IA input the branch predictor 110 is synchronized with the instruction-fetching address PC of the instruction cache 104. The instruction-address blocks to be predicted in the current round may partially overlap the instruction-address blocks to be predicted in the previous round. In another exemplary embodiment, the branch predictor 110 may lead the instruction fetching of the instruction cache 104 more significantly. For example, the instruction-address blocks processed by the branch predictor 110 in the first round may not overlap the instruction-address blocks processed by the branch predictor 110 in the second round. If no branch is taken in a series of instruction-address blocks A, B, C, D, E, and F having consecutive instruction addresses, the instruction-address blocks A, B and C sent to the branch predictor 110 in the first timing cycle may not overlap the instruction-address blocks D, E and F sent to the branch predictor 110 in the second timing cycle. In the first timing cycle, the fetching instruction-address block input the instruction cache 104 is instruction-address block A. In the second timing cycle, the fetching instruction-address block input the instruction cache 104 is instruction-address block B. The branch predictor 110 leads the instruction cache 104 significantly and thereby a taken branch is predicted in highly advance.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A microprocessor, comprising:
   an instruction cache; and
   a branch predictor with an N-stage pipelined architecture, coupled to the instruction cache and configured to perform branch prediction to control instruction fetching of the instruction cache, where N is a natural number that makes (N−1) greater than one,
   wherein:
   the branch predictor performs branch prediction for (N−1) instruction-address blocks in parallel to process multiple instruction-address blocks simultaneously in each stage, wherein the (N−1) instruction-address blocks include a starting instruction-address block and (N−2) subsequent instruction-address blocks; and
   the branch predictor stores reference information about branch prediction in at least one memory and searches the memory to get reference information in parallel for the branch prediction of the (N−1) instruction-address blocks.

2. The microprocessor as claimed in claim 1, wherein the branch predictor includes:
   a first memory, configured as a branch target address cache that outputs (N−1) pieces of branch destination information in parallel corresponding to the starting instruction-address block and the (N−2) subsequent instruction-address blocks; and
   (N−1) sets of branch logic circuits and a first multiplexer, wherein the (N−1) pieces of branch destination information are processed by the (N−1) sets of branch logic circuits and then sent to the first multiplexer, and a branch destination block is indicated by an output of the first multiplexer.

3. The microprocessor as claimed in claim 2, wherein:
the first memory includes at least (N−1) memory banks, and the different memory banks correspond to different instruction-address blocks identified by lower bits of instruction-address block address; and
the (N−1) pieces of branch destination information are stored in the different memory banks to be accessed in parallel.

4. The microprocessor as claimed in claim 2, wherein:
the first memory includes (N−1) input ports to receive the starting instruction-address block and the (N−2) subsequent instruction-address blocks in parallel and thereby the (N−1) pieces of branch destination information are accessed in parallel.

5. The microprocessor as claimed in claim 2, wherein the branch predictor includes:
a second memory, storing a branch history table, wherein:
the branch history table is searched by using a plurality of calculated results as indexes, wherein calculations are performed on the starting instruction-address block and the (N−2) subsequent instruction-address blocks respectively with a corresponding history pattern to generate the calculated results; and
by searching the branch history table, branch directions corresponding to the starting instruction-address block and the (N−2) subsequent instruction-address blocks are provided to control the (N−1) sets of branch logic circuits.

6. The microprocessor as claimed in claim 5, wherein the branch predictor further includes:
a shift register, storing the corresponding history pattern; and
the calculations involve a hash operation or a bitwise exclusive-or operation.

7. The microprocessor as claimed in claim 5, wherein:
when the corresponding history pattern is incomplete for a multistep-ahead instruction-address block of the starting instruction-address block and the (N−2) subsequent instruction-address blocks, the branch predictor provides a plurality of possible branch directions corresponding to the multistep-ahead instruction-address block in parallel based on a plurality of history pattern assumptions; and
after the incomplete history pattern is made up, the branch predictor selects a matched branch direction from the plurality of possible branch directions matched with the made up history pattern.

8. The microprocessor as claimed in claim 7, wherein:
the history pattern assumptions consider a case wherein an earlier instruction-address block whose branch prediction is unfinished involves no branch and a case wherein the earlier instruction-address block involves a branch not to be taken.

9. The microprocessor as claimed in claim 7, wherein:
when the starting instruction-address block and the (N−2) subsequent instruction-address blocks overlap (N−1) instruction-address blocks processed in a previous round of branch prediction, overlapped instruction-address blocks are omitted from processing by the branch predictor again, and each non-overlapped instruction-address block is processed by the branch predictor for parallel branch prediction based on the plurality of history pattern assumptions.

10. The microprocessor as claimed in claim 9, wherein:
the second memory has $2^{(N-2)}$ input ports to receive $2^{(N-2)}$ instruction-address blocks in parallel.

11. The microprocessor as claimed in claim 1, wherein:
N is 4; and
the branch predictor includes a first pipeline stage, a second pipeline stage, a third pipeline stage and a fourth pipeline stage.

12. The microprocessor as claimed in claim 11, wherein:
the branch predictor predicts a branch with a first instruction-address block as a destination, wherein subsequent to the first instruction-address block there are a second instruction-address block, a third instruction-address block and a fourth instruction-address block;
the first instruction-address block, the second instruction-address block, and the third instruction-address block proceed to the first pipeline stage in a first timing cycle, proceed to the second pipeline stage in a second timing cycle, proceed to the third pipeline stage in a third timing cycle, and proceed to the fourth pipeline stage in a fourth timing cycle;
in the second timing cycle, the fourth instruction-address block proceeds to the first pipeline stage while the first instruction-address block has not yet proceeded to the fourth pipeline stage;
in the second timing cycle, a first history pattern assumption is made for the fourth instruction-address block to consider a no-branch case of the first instruction-address block; and
in the second timing cycle, a second history pattern assumption is made for the fourth instruction-address block to consider a not-taken branch case of the first instruction-address block.

13. The microprocessor as claimed in claim 12, wherein:
the branch predictor obtains a branch prediction result of the first instruction-address block in the fourth timing cycle; and
in a fifth timing cycle following the fourth timing cycle, the branch predictor obtains a first possible branch prediction result for the fourth instruction-address block based on the first history pattern assumption and a second possible branch prediction result for the fourth instruction-address block based on the second history pattern assumption, and selects one of the first possible branch prediction result and the second possible branch prediction result according to the branch prediction result of the first instruction-address block as a branch prediction result of the fourth instruction-address block.

14. The microprocessor as claimed in claim 13, wherein:
a fifth instruction-address block is subsequent to the fourth instruction-address block;
in the third timing cycle, the fifth instruction-address block proceeds to the first pipeline stage while the first instruction-address block and the second instruction-address block have not yet proceeded to the fourth pipeline stage;
in the third timing cycle, a third history pattern assumption is made for the fifth instruction-address block to consider a case wherein both the first instruction-address block and the second instruction-address block involve no branch;
in the third timing cycle, a fourth history pattern assumption is made for the fifth instruction-address block to consider a case wherein the first instruction-address block involves no branch and the second instruction-address block involves a branch not to be taken;
in the third timing cycle, a fifth history pattern assumption is made for the fifth instruction-address block to consider a case wherein the first instruction-address block involves a branch not to be taken and the second instruction-address block involves no branch; and in the third timing cycle, a sixth history pattern assumption is made for the fifth instruction-address block to consider a case wherein both the first instruction-address block and the second instruction-address block involve a branch not to be taken.

15. The microprocessor as claimed in claim 14, wherein:

the branch predictor obtains a branch prediction result of the second instruction-address block in the fourth timing cycle; and in a sixth timing cycle following the fifth timing cycle, the branch predictor obtains a first possible branch prediction result for the fifth instruction-address block based on the third history pattern assumption, a second possible branch prediction result for the fifth instruction-address block based on the fourth history pattern assumption, a third possible branch prediction result for the fifth instruction-address block based on the fifth history pattern assumption, and a fourth possible branch prediction result for the fifth instruction-address block based on the sixth history pattern assumption, and selects the first possible branch prediction result, the second possible branch prediction result, the third possible branch prediction result, or the fourth possible branch prediction result of the fifth instruction-address block according to the branch prediction result of the first instruction-address block and the branch prediction result of the second instruction-address block as a branch prediction result of the fifth instruction-address block.

16. The microprocessor as claimed in claim 11, wherein the branch predictor comprises:

a first memory, configured as a branch target address cache, and including four memory banks; and three pieces of branch destination information of the starting instruction-address block and two subsequent instruction-address blocks, which are stored separately in three memory banks among the four memory banks, to be output from the first memory in parallel.

17. The microprocessor as claimed in claim 16, wherein:

the starting instruction-address block and two subsequent instruction-address blocks each correspond to 16 bytes of instructions and each comprises 16 instruction addresses, wherein each instruction address corresponds to one byte of instructions.

18. The microprocessor as claimed in claim 17, wherein the first memory further comprises:

a second multiplexer, controlled according to bits [5:4] of one of the instruction addresses, for the access of the three memory banks; and a third multiplexer, controlled according to the bits [5:4], to transfer the three pieces of branch destination information read from the three memory banks to three sets of branch logic circuits.

19. The microprocessor as claimed in claim 1, wherein:

the starting instruction-address block is synchronized to an instruction-fetching block of the instruction cache.

20. The microprocessor as claimed in claim 1, wherein:

the starting instruction-address block leads an instruction-fetching block of the instruction cache.

* * * * *